United States Patent
Schuster et al.

(10) Patent No.: US 12,438,482 B2
(45) Date of Patent: Oct. 7, 2025

(54) METHOD FOR OPERATING A DRIVE SYSTEM AND DRIVE SYSTEM FOR CARRYING OUT THE METHOD

(71) Applicant: SEW-EURODRIVE GMBH & CO. KG, Bruchsal (DE)

(72) Inventors: Thomas Schuster, Ottenbach (DE); Manuel Fuchs, Kronau (DE)

(73) Assignee: SEW-EURODRIVE GMBH & CO. KG, Bruchsal (DE)

( * ) Notice: Subject to any disclaimer, the term of this patent is extended or adjusted under 35 U.S.C. 154(b) by 190 days.

(21) Appl. No.: 18/279,937

(22) PCT Filed: Feb. 7, 2022

(86) PCT No.: PCT/EP2022/052911
§ 371 (c)(1),
(2) Date: Sep. 1, 2023

(87) PCT Pub. No.: WO2022/184383
PCT Pub. Date: Sep. 9, 2022

(65) Prior Publication Data
US 2024/0154546 A1    May 9, 2024

(30) Foreign Application Priority Data
Mar. 4, 2021    (DE) .......................... 102021001177.5

(51) Int. Cl.
*H02M 1/15* (2006.01)
*H02P 5/74* (2006.01)

(52) U.S. Cl.
CPC ..................................... *H02P 5/74* (2013.01)

(58) Field of Classification Search
CPC .... H02M 1/008; H02M 1/15; H02M 7/53871; H02M 1/0043; H02M 5/4585; H02M 7/5395; H02P 5/74
(Continued)

(56) References Cited

U.S. PATENT DOCUMENTS 5,990,657 A  * 11/1999  Masaki ................. B60L 15/025
                                                    363/160
6,801,441 B2 * 10/2004  Salama ............... H02M 5/4585
                                                    363/37
(Continued)

FOREIGN PATENT DOCUMENTS

DE    102006039406 A1    2/2008
DE    102010031244 A1    9/2011
(Continued)

OTHER PUBLICATIONS

DE2006039406A1_English_Machine_Translation (Year: 2008).*
(Continued)

*Primary Examiner* — Gabriel Agared
(74) *Attorney, Agent, or Firm* — Carter, DeLuca & Farrell LLP (57) ABSTRACT

In a method for operating a drive system having a plurality of inverters, a respective electric motor is fed from the AC-side terminal of the respective inverter, the DC-side terminals of the respective inverters are connected in parallel with one another and this parallel connection is connected to the DC-side terminal of a rectifier, each inverter has semiconductor switches driven according to a respective pulse width modulation, the inverters are arranged as bus subscribers of a data bus to which a module designed as master is also connected, and the master assigns the bus addresses to the inverters and thereafter to each inverter the polarity of its pulse width modulation.

31 Claims, 3 Drawing Sheets

(58) Field of Classification Search
USPC .......................................................... 318/112
See application file for complete search history.

(56) References Cited

U.S. PATENT DOCUMENTS

| | | | | |
|---|---|---|---|---|
| 9,525,364 | B2* | 12/2016 | Garrity | .................. H02M 1/42 |
| 9,621,100 | B2* | 4/2017 | Asai | ........................ H02P 25/22 |
| 2005/0281060 | A1* | 12/2005 | Saren | ................... H02M 5/458 |
| | | | | 363/16 |
| 2013/0193849 | A1 | 8/2013 | Zimmermann | |
| 2019/0214919 | A1* | 7/2019 | Schmidt | .................... H02J 1/16 |
| 2021/0075352 | A1* | 3/2021 | Tang | ................. H02M 7/53871 |
| 2021/0305919 | A1* | 9/2021 | Tang | ....................... B60L 50/51 |
| 2023/0130278 | A1* | 4/2023 | Huh | ...................... H02P 27/085 |
| | | | | 307/9.1 |

FOREIGN PATENT DOCUMENTS

| | | |
|---|---|---|
| DE | 102016008951 A1 | 2/2018 |
| DE | 102018210244 A1 | 12/2019 |
| EP | 3125393 A1 | 2/2017 |

OTHER PUBLICATIONS

International Report on Patentability issued in corresponding International Application No. PCT/EP2022/052911 dated Aug. 29, 2023, pp. 1-8, English Translation.
International Search Report issued in corresponding International Application No. PCT/EP2022/052911 dated May 17, 2022, pp. 1-2, English Translation.

* cited by examiner

METHOD FOR OPERATING A DRIVE SYSTEM AND DRIVE SYSTEM FOR CARRYING OUT THE METHOD

FIELD OF THE INVENTION

The present invention relates to a method for operating a drive system and a drive system for carrying out the method.

BACKGROUND INFORMATION

In certain conventional systems, a drive system allows electric motors to be operated in a speed-controlled or torque-controlled manner.

German Patent Document No. 10 2018 210 244 describes a method for operating an electric drive system.

A method for controlling an intermediate voltage circuit is described in German Patent Document No. 10 2016 008 951.

SUMMARY

Example embodiments of the present invention provide a drive system, in which the service life is to be increased.

According to example embodiments, in a method for operating a drive system having a plurality of inverters, e.g., more than two inverters, a respective electric motor is fed from the AC-side terminal of the respective inverter. The DC-side terminals of the respective inverters are connected in parallel with one another and this parallel connection is connected to the DC-side terminal of a rectifier, e.g., a recovery rectifier, e.g., by conductor rails. Each inverter has semiconductor switches driven according to a respective pulse width modulation, and the inverters are arranged as bus subscribers of a data bus to which a module arranged as master is also connected. For example, the module includes the rectifier. The master, e.g., during start-up of the drive system, assigns the bus addresses to the inverters and thereafter specifies to each inverter the polarity of its pulse width modulation, e.g., of its pulse width modulation method. The polarity of the pulse width modulation of a first of the inverters is different from the polarity of the pulse width modulation of a second of the inverters, e.g., such that the pulse width modulation of the drive signals for the controllable semiconductor switches of a first of the inverters is carried out counter-synchronously clocked to the pulse width modulation of the drive signals for the controllable semiconductor switches of a second of the inverters.

Thus, compensation currents, e.g., leakage currents, are reduced and a line filter connected to the rectifier on the line side thus has a longer service life.

According to example embodiments, each inverter has half-bridges connected in parallel to one another and fed from the DC voltage, each of which is arranged as a series connection of at least two controllable semiconductor switches. The semiconductor switches of the respective inverter are driven with pulse width modulated drive signals according to the pulse width modulation of the inverter and their polarity. Thus, the different inverters can have a different polarity. Thus, the compensation currents can be reduced in or via the intermediate circuit and components can be subjected to a lower load, e.g., a line filter arranged at the AC-side terminal of the rectifier.

According to example embodiments, at the beginning of a respective pulse width modulation period, the upper switch of the first half-bridge of the first inverter is open and the lower switch of this first half-bridge of the first inverter is closed. For example, the upper switch is connected to the upper potential of the voltage applied to the DC terminal of the inverter, and the lower switch is connected to the lower potential of the voltage applied to the DC terminal of the inverter. Thus, the first inverter has a positive polarity and the next-adjacent inverter can be assigned a reverse polarity, i.e., a negative polarity.

According to example embodiments, starting from the master, the inverters are arranged in series along the data bus. Starting from the master, e.g., successively, each inverter assigns a bus address to the inverter downstream of it in the series until an inverter recognizes itself as the last in the series due to the failure of a further allocation of a bus address and thereupon, and sets a default value as the polarity of its pulse width modulation, whereupon, starting from the last inverter, e.g., successively, each inverter transmits to the inverter upstream of it in the series a polarity inverted to its own polarity, which the upstream inverter sets as the polarity of its pulse width modulation, e.g., if it is not arranged as a double inverter, e.g., a double axis, and otherwise passes on to the inverter in turn arranged upstream of it. The inverter arranged as a double inverter has a single bus address and two single inverters arranged in a common housing, the pulse width modulations of which have an inverted polarity with respect to one another. Thus, no central assignment but a decentralized automatic assignment of addresses and polarity is achievable.

According to example embodiments, the data bus has a forward channel and a reverse channel such that each inverter has an input and an output of the forward channel and has an input and an output of the reverse channel, and the master is connected to the input of the forward channel of the first inverter and to the output of the reverse channel of the first inverter. For address assignment, the master sends a first bus address to a first inverter via the forward channel, which the first inverter adopts as its own bus address. The first inverter generates a second bus address from the first bus address, e.g., by incrementation, and sends it to the second inverter via the forward channel, and the second inverter adopts the second bus address and generates a third bus address from the second bus address, e.g., by incrementation, and forwards it via its forward channel. Each further inverter adopts the bus address received via its input of the forward channel as its own bus address and generates a further bus address from the received bus address, e.g., by incrementation, and sends it to the downstream inverter via the forward channel. A last inverter recognizes itself as the last inverter due to the failure of a further sending of the bus address generated by it. Thus, a high level of security can be achieved during the method, since the forward channel and the reverse channel are separated and each bus subscriber can first examine the data received to determine whether it is intended for it or whether it should be forwarded.

According to example embodiments, during start-up, for example, the master sends a broadcast telegram recurrently for address assignment via the data bus, e.g., during start-up and recurrently, which assigns to a respective address information a respective polarity information, e.g., so that the first inverter is assigned a first polarity and the second inverter is assigned a second polarity, e.g., a polarity different from the first polarity. Thus, the inverters receive an address one after the other such that only one of the inverters at a time is set to readiness to use the respective address transmitted with the broadcast telegram.

According to example embodiments, a voltage signal can be fed from the master to a first inverter and a voltage signal can be fed from a respective inverter to a respective next inverter. The respective inverter receiving the voltage signal takes the address information and/or polarity information contained in a temporally next broadcast telegram of the master for itself. Thus, only one of the inverters is ready at a time to take the address contained in the broadcast telegram, and after the inverter has taken it, it passes on a voltage signal to switch the next inverter to readiness.

According to example embodiments, the inverters are arranged in a series with respect to the forwarding of the voltage signal and/or with respect to the data bus, e.g., so that from the first inverter to the penultimate inverter of the series, there is another inverter downstream of each of the inverters. Thus, the inverters can be connected to a serial data bus.

According to example embodiments, a last inverter, e.g., one from which no downstream inverter can be fed a voltage signal, specifies to its upstream inverter the polarity which is inverted to its own polarity used in the pulse width modulation, whereupon the upstream inverter specifies to its upstream inverter the polarity which is inverted to its own polarity used in the pulse width modulation. Thus, the address assignment in the series of the inverters takes place forward and the polarity assignment in the series takes place backward.

According to example embodiments, after the address assignment to the inverters, the master transmits to them the polarity to be used in their respective pulse width modulation, and the polarities are assigned in each case such that the sum of the nominal power of the respective inverter multiplied by its respective polarity becomes minimal in terms of amount. For example, adjacently arranged inverters have a polarity different from one another. Thus, the different polarities are assigned depending on the respective nominal power of the inverters such that the load caused by compensation currents, e.g., leakage currents, especially in the intermediate circuit, is as low as possible. For example, the sum of the products of the nominal power and the polarity is as small as possible.

According to example embodiments, for address assignment, a respective inverter supplies a voltage signal to a downstream inverter, with which the respective downstream inverter is signaled to accept the address contained in the temporally subsequent next broadcast telegram of the master as its own bus address and to supply a further voltage signal to a further inverter itself if such an inverter is present and otherwise to adapt the polarity of its pulse width modulation to the polarity information contained in the broadcast telegram. Thus, a decentralized assignment of polarities can be performed.

According to example embodiments, the drive system has a first inverter and a second inverter, a first electric motor is fed from the AC-side terminal of the first inverter, and a second electric motor is fed from the AC-side terminal of the second inverter. The DC-side terminal of the first inverter is connected in parallel with the DC-side terminal of the second inverter and this parallel connection is supplied from a DC voltage, e.g., an intermediate circuit voltage, e.g., by conductor rails. The first inverter has half-bridges connected in parallel to one another and fed from the DC voltage, each of which is arranged as a series connection of at least two controllable semiconductor switches, and the second inverter has half-bridges connected in parallel to one another and fed from the DC voltage, each of which is arranged as a series connection of at least two controllable semiconductor switches. The semiconductor switches of the first inverter are driven with pulse width modulated drive signals, and the semiconductor switches of the second inverter are driven with pulse width modulated drive signals. The pulse width modulation of the drive signals for the controllable semiconductor switches of the first inverter is carried out counter-synchronously clocked to the pulse width modulation of the drive signals for the controllable semiconductor switches of the second inverter.

Thus, leakage currents on the DC side, e.g., compensation currents, can be reduced or prevented. This means that the load on a line filter can also be reduced and its service life increased, thus increasing also the service life of the entire drive system.

According to example embodiments, the drive system has a first inverter and a second inverter, a first electric motor is fed from the AC-side terminal of the first inverter, and a second electric motor is fed from the AC-side terminal of the second inverter. The DC-side terminal of the first inverter is connected in parallel with the DC-side terminal of the second inverter and this parallel connection is supplied from a DC voltage, e.g., an intermediate circuit voltage, e.g., by conductor rails. The first inverter has half-bridges connected in parallel to one another and fed from the DC voltage, each of which is arranged as a series connection of at least two controllable semiconductor switches, and the second inverter has half-bridges connected in parallel to one another and fed from the DC voltage, each of which is arranged as a series connection of at least two controllable semiconductor switches. The semiconductor switches of the first inverter are driven with pulse width modulated drive signals, and the semiconductor switches of the second inverter are driven with pulse width modulated drive signals. As long as the quotient of the pulse width modulation ratio of the drive signal for a first semiconductor bridge of the first inverter and the pulse width modulation ratio of the drive signal for a second semiconductor bridge of the second inverter is smaller than a threshold value, e.g., 1, at the beginning of a respective pulse width modulation period, the upper switch of the first half-bridge of the first inverter is open and the lower switch of this first half-bridge of the first inverter is closed, and the upper switch of the second half-bridge of the second inverter is closed and the lower switch of this second half-bridge of the second inverter is open. As long as the quotient of the pulse width modulation ratio of the drive signal for a first semiconductor bridge of the first inverter and the pulse width modulation ratio of the drive signal for a second semiconductor bridge of the second inverter is larger than a threshold value, e.g., 1, at the beginning of a respective pulse width modulation period, the upper switch of the first half-bridge of the first inverter is open and the lower switch of this first half-bridge of the first inverter is closed, and the upper switch of the second half-bridge of the second inverter is open and the lower switch of this second half-bridge of the second inverter is closed.

Thus, compensation currents are reduced, reducing the load on the line filter and increasing its service life.

According to example embodiments, a drive system has a first inverter, a second inverter, a first electric motor fed from the AC-side terminal of the first inverter, and a second electric motor fed from the AC-side terminal of the second inverter. The DC-side terminal of the first inverter is connected in parallel with the DC-side terminal of the second inverter and this parallel connection is supplied from a DC voltage, e.g., an intermediate circuit voltage, e.g., by conductor rails. The first inverter has half-bridges connected in parallel to one another and fed from the DC voltage, each of which is arranged as a series connection of at least two controllable semiconductor switches, and the second inverter has half-bridges connected in parallel to one another and fed from the DC voltage, each of which is arranged as a series connection of at least two controllable semiconductor switches. The semiconductor switches of the first inverter are driven with pulse width modulated drive signals, and the semiconductor switches of the second inverter are driven with pulse width modulated drive signals. As long as the difference between the pulse width modulation ratio of the drive signal for a first semiconductor bridge of the first inverter and the pulse width modulation ratio of the drive signal for a second semiconductor bridge of the second inverter is smaller than a threshold value, e.g., 50%, at the beginning of a respective pulse width modulation period, the upper switch of the first half-bridge of the first inverter is open and the lower switch of this first half-bridge of the first inverter is closed, and the upper switch of the second half-bridge of the second inverter is closed and the lower switch of this second half-bridge of the second inverter is open. As long as the difference between the pulse width modulation ratio of the drive signal for a first semiconductor bridge of the first inverter and the pulse width modulation ratio of the drive signal for a second semiconductor bridge of the second inverter is larger than a threshold value, e.g., 50%, at the beginning of a respective pulse width modulation period, the upper switch of the first half-bridge of the first inverter is open and the lower switch of this first half-bridge of the first inverter is closed, and the upper switch of the second half-bridge of the second inverter is open and the lower switch of this second half-bridge of the second inverter is closed.

Thus, compensation currents are reduced, reducing the load on the line filter and increasing its service life.

According to example embodiments, the DC voltage is provided at the DC-side terminal of a line-fed rectifier, and, for example, the rectifier, e.g., at its AC-side terminal, is supplied from an AC voltage network, e.g., with three-phase voltage. For example, the DC-side terminal of the rectifier is connected in parallel with the DC-side terminal of the first inverter and with the DC-side terminal of the second inverter. Thus, compensation currents are reduced, reducing the load on the line filter and increasing its service life.

According to example embodiments, the pulse width modulation signals of the first inverter run synchronously, e.g., synchronized, with the pulse width modulation signals of the second inverter. Thus, compensation currents are reduced, reducing the load on the line filter and increasing its service life.

According to example embodiments, the start of the pulse width modulation periods of the first and second inverter is synchronous and/or simultaneous. Thus, compensation currents are reduced, reducing the load on the line filter and increasing its service life.

According to example embodiments, within each pulse width modulation period, the first switching edge of a drive signal for an upper semiconductor switch of the first inverter is inverted and/or occurs inversely to the first switching edge of a drive signal for an upper semiconductor switch of the second inverter. Thus, compensation currents are reduced, reducing the load on the line filter and increasing its service life.

According to example embodiments, one of the controllable semiconductor switches, i.e., upper semiconductor switches, of a respective half-bridge is connected to the upper potential of the DC voltage.

According to example embodiments, one of the controllable semiconductor switches, i.e., lower semiconductor switches, of a respective half-bridge is connected to the lower potential of the DC voltage. Thus, the half-bridge, i.e., a bridge branch, can be supplied from the DC voltage and the half-bridge can be implemented as a series connection of second semiconductor switches, e.g., IGBT or MODFET.

According to example embodiments, at the beginning of a respective pulse width modulation period, the upper switch of a first half-bridge of the first inverter is open and the lower switch of this first half-bridge of the first inverter is closed and the upper switch of a second half-bridge of the second inverter is closed and the lower switch of this second half-bridge of the second inverter is open. Thus, the compensation currents are reduced as much as possible by the clocking of the two pulse width modulations of the two inverters, which clocking is inverted with respect to one another.

According to example embodiments, as long as the quotient of the pulse width modulation ratio of the drive signal for a first semiconductor bridge of the first inverter and the pulse width modulation ratio of the drive signal for a second semiconductor bridge of the second inverter is smaller than a threshold value, e.g., 1, at the beginning of a respective pulse width modulation period, the upper switch of the first half-bridge of the first inverter is open and the lower switch of this first half-bridge of the first inverter is closed and the upper switch of the second half-bridge of the second inverter is closed and the lower switch of this second half-bridge of the second inverter is open. As long as the quotient of the pulse width modulation ratio of the drive signal for a first semiconductor bridge of the first inverter and the pulse width modulation ratio of the drive signal for a second semiconductor bridge of the second inverter is larger than a threshold value, e.g., 1, at the beginning of a respective pulse width modulation period, the upper switch of the first half-bridge of the first inverter is open and the lower switch of this first half-bridge of the first inverter is closed and the upper switch of the second half-bridge of the second inverter is open and the lower switch of this second half-bridge of the second inverter is closed.

Thus, the inverted clocking is only carried out when the threshold value is undershot. Thus, the compensation currents are reduced as much as possible.

According to example embodiments, as long as the difference between the pulse width modulation ratio of the drive signal for a first semiconductor bridge of the first inverter and the pulse width modulation ratio of the drive signal for a second semiconductor bridge of the second inverter is smaller than a threshold value, e.g., 50%, at the beginning of a respective pulse width modulation period, the upper switch of the first half-bridge of the first inverter is open and the lower switch of this first half-bridge of the first inverter is closed and the upper switch of the second half-bridge of the second inverter is closed and the lower switch of this second half-bridge of the second inverter is open. As long as the difference between the pulse width modulation ratio of the drive signal for a first semiconductor bridge of the first inverter and the pulse width modulation ratio of the drive signal for a second semiconductor bridge of the second inverter is larger than a threshold value, e.g., 50%, at the beginning of a respective pulse width modulation period, the upper switch of the first half-bridge of the first inverter is open and the lower switch of this first half-bridge of the first inverter is closed and the upper switch of the second half-bridge of the second inverter is open and the lower switch of this second half-bridge of the second inverter is closed.

Thus, the inverted clocking is only carried out when the threshold value is undershot. Thus, the compensation currents are reduced as much as possible.

According to example embodiments, a synchronization signal, e.g., a synchronization signal having synchronization pulses, is modulated onto conductor rails which connect the DC-side terminals of the inverters to each other and to the DC-side terminal of the rectifier. Thus, the pulse width modulation frequency of the first inverter is synchronized with that of the second inverter and the inverse clocking can be carried out in synchronized manner. The synchronization signal can be transmitted via a data bus connection which links the signal electronics of the two inverters. Alternatively, however, modulation onto the conductor rails can be carried out so that no further communication link between the inverters needs to be provided.

According to example embodiments, in a drive system for carrying out the method described herein, the DC-side terminals of the inverters are connected to each other and to the DC-side terminal of the rectifier by conductor rails.

Thus, a simple low-cost connection is possible.

Further features and aspects of example embodiments of the present invention are described in more detail below with reference to the appended schematic Figures.

DETAILED DESCRIPTION

Figure 1:
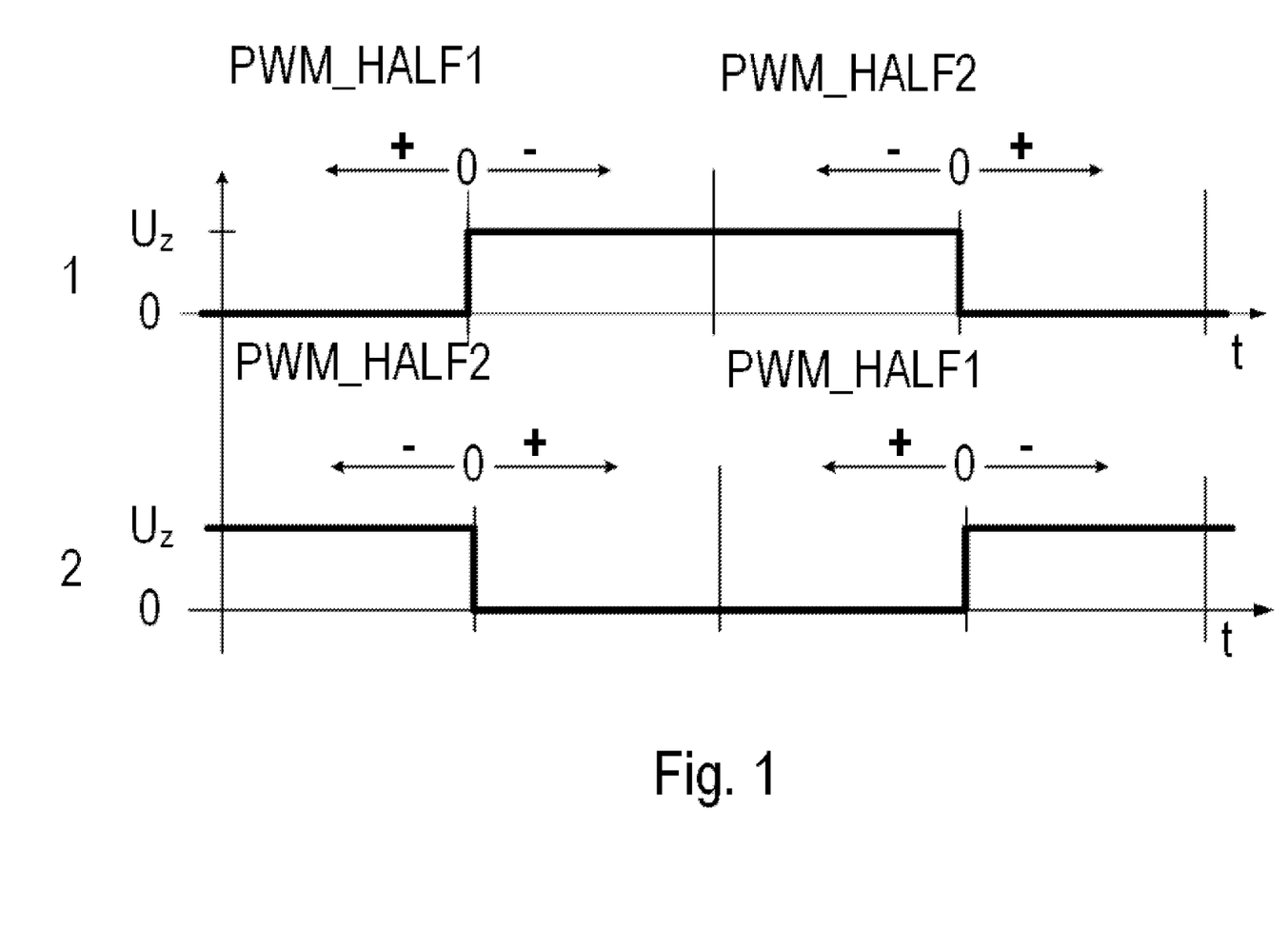
FIG. 1 illustrates the phase voltages at a first AC-side terminal of a first inverter 1 and at a first AC-side terminal of a first inverter 2.
Figure 2:
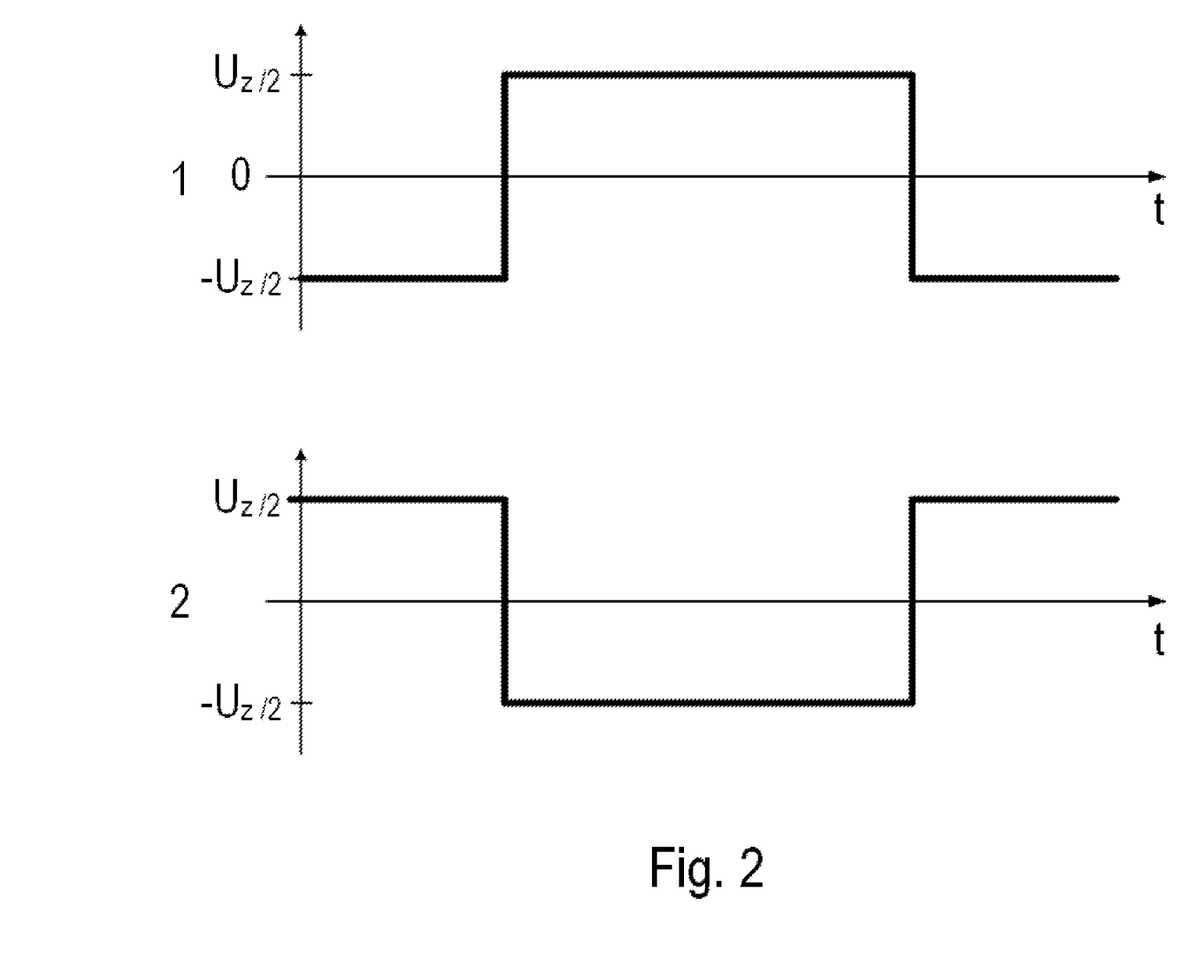
FIG. 2 illustrates the phase voltages against ground potential.

As illustrated in FIGS. 1 and 2, a first drive system according has a first inverter 1 and a second inverter 2, which are supplied in parallel by a DC voltage with their DC-side terminal.

For example, this DC voltage is provided by a line-fed rectifier.

For example, each of the two inverters (1, 2) has a smoothing capacitor, e.g., a smoothing capacitor having a plurality of pieces, at its DC-side terminal.

Each of the two inverters (1, 2) has three series connections connected in parallel, and each series connection has two controllable semiconductor switches. At the connection node of the two controllable semiconductor switches of a respective series connection, a respective phase voltage is thus made available to the electric motor.

For example, the AC-side terminal of the inverter is arranged as a three-phase connection, so that each inverter (1, 2) has three of these series connections and thus three phase voltages are made available to the motor.

Each inverter (1, 2) has an electronic circuit arranged as signal electronics, which generates pulse width modulated control signals for the controllable semiconductor switches of the inverter (1, 2).

As illustrated in FIG. 1, to generate a respective value of phase voltage, the pulse width modulation ratio is specified within a pulse width modulation period. FIG. 1 illustrates a pulse width modulation ratio of 50%. For example, at the beginning of the pulse width modulation period, the lower semiconductor switch of the series connection is closed and the upper semiconductor switch of the series connection is opened.

Thus, the connection for the phase voltage is connected to the lower potential of the DC voltage, i.e., the DC intermediate circuit voltage U_z. After a quarter of the period of the pulse width modulation period has elapsed, the lower semiconductor switch is opened and the upper one is closed, so that the connection for the phase voltage is connected to the upper potential of the DC voltage, in which this lasts for half the period.

For example, the second inverter 2 is operated with switching edges inverted relative to the first inverter. In FIG. 1, a pulse width modulation ratio of 50% is again selected as an example. For example, however, in the series connection of the second inverter 2, at the beginning of the pulse width modulation period, the upper semiconductor switch of the series connection is closed and the lower semiconductor switch of the series connection is opened. Thus, the connection for the phase voltage of the second inverter 2 associated with this series connection is connected to the upper potential of the DC voltage, i.e., the DC intermediate circuit voltage U_z. After a quarter of the period of the pulse width modulation period has elapsed, the upper semiconductor switch is opened and the lower one is closed, so that the connection for the phase voltage is connected to the lower potential of the DC voltage, in which this lasts for half the period.

If other pulse width modulation ratios are controlled instead of the 50% in the series connections, the respective switching edge is shifted to plus + or minus −, as illustrated in FIG. 1. Thus, the semiconductor switches of the half-bridge of the first inverter 1 do not switch exactly simultaneously with the half-bridge of the second inverter 2.

In this manner, compensation currents in the DC intermediate circuit, i.e., between the DC-side connections of the inverters (1, 2), are at least reduced or even completely avoided.

This aspect is significant if very long cables are used from the AC-side terminal of the respective inverter (1, 2) to the respective electric motor. Because there are high ground capacitances of the cables and motors, so that a common line filter, which is arranged at the line-fed rectifier providing the DC voltage, is exposed to high leakage currents.

If the first switching edge within the pulse width modulation period jumps to the upper potential, the pulse width modulation has a positive polarity. If the first switching edge within the pulse width modulation period jumps to the lower potential, the pulse width modulation has a negative polarity.

To synchronize the pulse width modulation of the two inverters (1, 2) with each other, a synchronization signal is transmitted recurrently. For example, the signal electronics of the first inverter 1 is connected to the signal electronics of the second inverter 2 via a data bus connection for this purpose. For example, this data bus connection is arranged as a cable connection, e.g., r in a shielded cable.

Alternatively, the synchronization signal is modulated onto the DC-side connection of the inverters (1, 2). Since the upper potential of the DC side terminal of the first inverter 1 is, for example, connected to the upper potential of the DC side terminal of the second inverter 1 by a conductor rail to allow a strong current to pass through, the synchronization signal is thus modulated onto the current present in the conductor rail. The coupling of the medium-frequency or high-frequency synchronization signal to the conductor rail takes place in the first inverter 1 via a capacitance; the decoupling of the signal in the second inverter 2 also takes place via a capacitance. Alternatively, inductive and thus safe and potential-free coupling and decoupling is possible, but this would lead to higher costs.

According to example embodiments, the described inversion of the pulse width modulation signal is operated at the second inverter 2 only as long as the value of the difference of the two pulse width modulation ratios is less than 50%. If this 50% is exceeded, the inversion is canceled and a synchronous equally-clocked pulse width modulation signal is used.

Alternatively, the quotient of the two pulse width modulation ratios can also be used as a criterion. If this quotient exceeds the value 1, the inversion described above is applied and otherwise not.

In this manner, a reduction of the compensation currents can be achieved even if the two inverters (1, 2) have very different operating points. This is the case, for example, when the first inverter 1 generates a high phase voltage, i.e., for example, a potential close to the upper potential of the DC voltage, and the second inverter 2 generates a low phase voltage, i.e., for example, a potential close to the lower potential of the DC voltage. An example of a high phase voltage is $0.9*U\_z$ and an example of a low phase voltage is $0.1*U\_z$.

Figure 3:
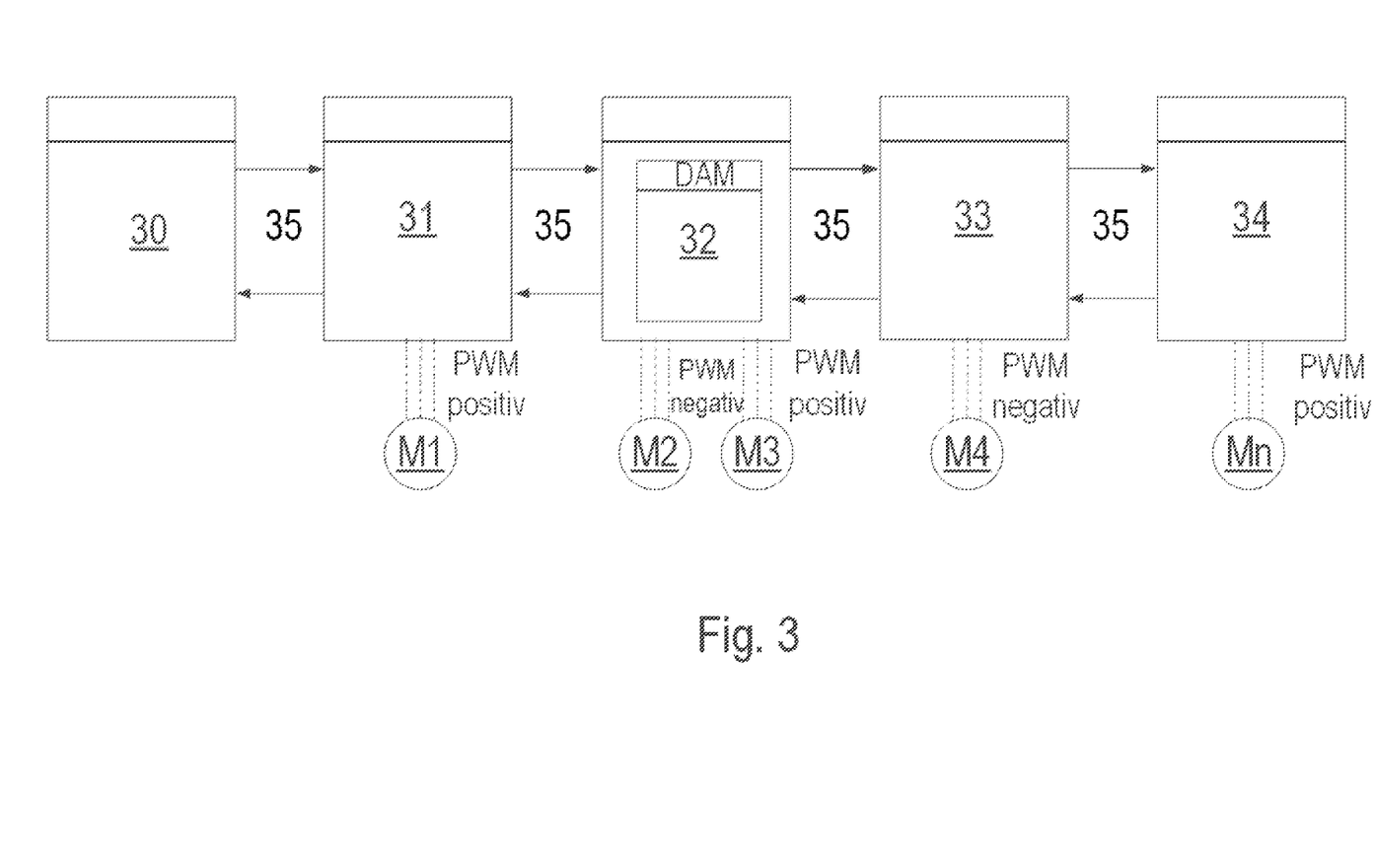
FIG. 3 illustrates a drive system according to an example embodiment of the present invention with more than two inverters.

As illustrated in FIG. 3, a second drive system has a data bus 35, via which a supply module arranged as a master 3 is connected to inverters (31, 32, 33, 34) for data exchange.

The supply module has a line-fed rectifier, from whose DC-side terminal the inverters (31, 32, 33, 34) are fed. For this purpose, the DC-side terminals of the inverters (31, 32, 33, 34) are connected in parallel to the DC-side terminal of the rectifier.

For example, the rectifier is arranged as a recovery rectifier, i.e., for example, as an AC/DC converter, which, when there is predominantly motor power from the drive system, rectifies electrical power from the AC supply network and makes it available to the inverters at the DC-side terminal as an intermediate circuit voltage and, when there is predominantly generator power from the drive system, feeds electrical power from the DC-side terminal of the rectifier back into the AC network.

In addition, during start-up of the drive system, the supply module arranged as master 30 first assigns the bus addresses to the inverters (31, 32, 33, 34) which are arranged as bus subscribers and are arranged in series with respect to the data bus.

For this purpose, the master 30 assigns a first bus address to the inverter 31 which is the first in the serial arrangement as seen from the master. This is achieved by the master 30 generating a voltage signal which indicates to the first inverter 31, which is directly connected with an electrical line, that it will adopt as its own bus address the bus address contained in the next broadcast telegram sent by the master. Thereafter, the first inverter 31 also generates a voltage signal for the second inverter 32, so that the bus address contained in the next broadcast telegram is taken over by the second inverter 32. This method of assigning addresses is continued up to the last inverter 34 arranged as a bus subscriber.

After or at the end of the address assignment the master sends a specified polarity of the pulse width modulation to the last bus subscriber or the last one uses a default value for its polarity. Thus, the pulse width modulation for the last inverter is determined, e.g., the direction of the first, i.e., temporally first, switching edge within each pulse width modulation period. For example, the direction of this first switching edge is specified as a rising edge and not a falling edge.

Thereafter, the last inverter 34 generates a voltage signal on the or on another electrical line, thus specifying to the upstream inverter 33 an inverted edge direction of the first switching edge of its pulse width modulation. For example, the last inverter 34 transmits a polarity inverted to its own polarity to the upstream inverter 33. This method is continued in this manner up to the first inverter 31, so that bus subscribers next-adjacent to each other in each case have inverted edge directions of their respective first switching edge with respect to one another in the respective pulse width modulation period.

Thus, for example, the master does not have to calculate in advance which inverter gets which polarity and thus does not have to make a central specification, but rather the polarity is assigned decentrally.

According to example embodiments, after the address assignment to the bus subscribers, the nominal power is determined by the respective inverter and the polarity is assigned depending on this, so that approximately half of the nominal power of the drive system has a first polarity and the remaining inverters have the inverted polarity. In addition, the polarity is, for example, assigned such that next-adjacent inverters along the serial connection preferably have different polarities.

Thus, the assignment of polarity is performed according to these two optimization criteria.

The second inverter 32 has two AC-side connections, so that a second electric motor M2 and a third electric motor M3 can each be supplied with a pulse width modulated voltage. For example, the same polarity is used for the two pulse width modulations, since the two pulse width modulations are carried out in the same device, i.e., within the same housing.

For example, a line filter is arranged between the AC supply network, which is, e.g., arranged as a three-phase voltage network, and the AC-side terminal of the rectifier of the supply module.

This line filter has three capacitances which are electrically connected to each other at their first terminal and connected to a respective phase of the AC-side terminal of the rectifier of the supply module at their other terminal. Thus, a neutral point is formed at the respective first terminal. This neutral point is galvanically connected to a protective conductor and/or to electrical ground.

At the DC-side terminal of the rectifier, a voltage divider formed by two series-connected capacitances is formed, the connection node of which, e.g., the potential created by the division of the intermediate circuit voltage, is galvanically connected to the neutral point, e.g., also to the protective conductor and/or to electrical ground.

Furthermore, three additional capacitances are also provided, which are electrically connected to each other at their first terminal and connected to a respective motor phase at their other terminal. Thus, a neutral point is also formed at their first terminal, which is electrically connected to the aforementioned neutral point.

The inverter in turn has three half-bridges supplied in parallel to each other from the DC voltage applied to the DC side terminal of the inverter, and the connection nodes, e.g., bridge branches, of the half-bridges are connected to the motor phases. Each of the half bridges has a series connection of an upper and a lower controllable semiconductor switch.

According to example embodiments, each inverter is connected to its adjacent inverter or master with a forward channel and a reverse channel, as illustrated in FIG. 3.

At start-up or initialization, each inverter first reports by sending a telegram to the master 30 on the reverse channel, which is, in turn, forwarded by the upstream inverter via its reverse channel until, continued in this manner, it reaches the master 30.

For address assignment, the master 30 sends a bus address to the first inverter 31 on the forward channel, which this first inverter 31 adopts for itself. Then, the first inverter 31 adds a value to the bus address or increments it, and it transmits this resulting bus address to the second inverter 32 on the forward channel. The second inverter 32 proceeds in the same manner, and the third inverter 33 proceeds in the same manner. If the fourth inverter 33 sends the bus address it incremented on its forward channel and receives no response on its reverse channel input within a period of time, it determines that it is the last inverter in the drive system. So, it reads the default value of the parameter describing the polarity of its pulse width modulation from its data memory and activates it in its inverter's signal electronics which carries out the pulse width modulation.

Thereafter, the last inverter 34 sends information about the polarity of the last inverter 34 to the inverter 33 upstream of it via the reverse channel. The inverter 33 receives this information and activates in its pulse width modulation the polarity inverted to the polarity of the last inverter 34. This method is continued in this manner up to the first inverter 31.

However, if an inverter, which is also arranged as a bus subscriber and thus has only a single bus address, is arranged in multiple parts, i.e., is composed of two individual inverters arranged in a common housing, the information received from the downstream inverter via the reverse channel is forwarded unchanged to the inverter upstream of this inverter composed of two individual inverters, since the two individual inverters receive polarity which is inverted with respect to one another. For example, this polarity, which is inverted to one another, is permanently set by hardware.

Such an inverter composed of two individual inverters, i.e., single inverters, can also be referred to as a double inverter or double axis.

LIST OF REFERENCE CHARACTERS

1 First inverter
2 Second inverter
30 Master
31 First inverter as first slave
32 Second inverter as third slave
33 Third inverter as third slave
34 Last inverter as last slave
35 Data bus
M1 First electric motor
M2 Second electric motor
M3 Third electric motor
M4 Fourth electric motor
Mn Last electric motor

The invention claimed is:

1. A method for operating a drive system having a plurality of inverters and a data bus, each inverter including an AC-side terminal adapted to feed a respective electric motor, DC-side terminals of the inverters being connected in parallel with one another and the parallel connection being connected to a DC-side terminal of a rectifier, each inverter including semiconductor switches adapted to be driven according to a pulse width modulation, the inverters being arranged as bus subscribers of a data bus to which a module arranged as master is also connected, comprising:
    assigning a respective bus address to each inverter; and
    after the assigning, specifying a polarity of the pulse width modulation to each inverter;
    wherein the polarity of a first one of the inverters is different than the polarity of a second one of the inverters; and
    wherein, for address assignment, a respective inverter supplies a voltage signal to a downstream inverter, with which the downstream inverter is signaled to accept the address contained in a temporally subsequent next broadcast telegram of the master as its own bus address and to supply a further voltage signal to a further inverter if such an inverter is present and otherwise to adapt the polarity of its pulse width modulation to the polarity information contained in the broadcast telegram.

2. The method according to claim 1, wherein the plurality of inverters includes more than two inverters, the rectifier includes a controllable rectifier and/or a recovery rectifier, the parallel connection being connected to the DC-side terminal of the rectifier by conductor rails, the module including the rectifier.

3. The method according to claim 1, wherein the assigning is performed during initialization and/or start-up of the drive system, and the specifying includes specifying a pulse width modulation method to each inverter.

4. The method according to claim 1, wherein the pulse width modulation of drive signals for the semiconductor switches of the first one of the inverters is performed counter-synchronously clocked to the pulse width modulation of drive signals of the second conductor switches of the second one of the inverters.

5. The method according to claim 1, wherein each inverter includes half-bridges connected in parallel to one another and fed from a DC voltage, each half bridge arranged as a series connection of at least two controllable semiconductor switches, the semiconductor switches of the each inverter being driven with pulse width modulated drive signals according to the pulse width modulation of the inverter and the polarity.

6. The method according to claim 1, wherein at a beginning of a respective pulse width modulation period, an upper switch of a first half-bridge of the first one of the inverters is open and a lower switch the this first half-bridge of the first one of the inverters is closed.

7. The method according to claim 6, wherein the upper switch is connected to an upper potential of a voltage applied to the DC-side terminal of the inverter and the lower switch is connected to a lower potential of the voltage applied to the DC-side terminal of the inverter.

8. The method according to claim 1, wherein an inverter arranged as a double inverter has a single bus address and the pulse width modulations of two single inverters arranged in a common housing have an inverted polarity with respect to one another.

9. The method according to claim 1, wherein the master sends a broadcast telegram recurrently for address assignment via the data bus, which assigns to a respective address information a respective polarity information.

10. A drive system, comprising:
    a plurality of inverters; and
    a data bus;
    wherein the drive system is adapted to perform the method recited in claim 1;
    wherein the DC-side terminals of the inverters are connected to each other and to the DC-side terminal of the rectifier by conductor rails; and wherein each inverter is connected to an upstream inverter and/or a downstream inverter by at least one line adapted to feed a voltage signal with at least one electrical line.

11. A method for operating a drive system having a plurality of inverters and a data bus, each inverter including an AC-side terminal adapted to feed a respective electric motor, DC-side terminals of the inverters being connected in parallel with one another and the parallel connection being connected to a DC-side terminal of a rectifier, each inverter including semiconductor switches adapted to be driven according to a pulse width modulation, the inverters being arranged as bus subscribers of a data bus to which a module arranged as master is also connected, comprising:

assigning a respective bus address to each inverter; and
after the assigning, specifying a polarity of the pulse width modulation to each inverter;
wherein the polarity of a first one of the inverters is different than the polarity of a second one of the inverters; and
wherein starting from the master, the inverters are arranged in series along the data bus, the assigning including, starting from the master, each inverter assigning a bus address to a downstream inverter in the series until an inverter recognizes itself as a last in the series due to a failure of a further allocation of a bus address, and thereupon, setting a default value as the polarity of the pulse width modulation, whereupon, starting from the last inverter, each inverter transmits to an upstream inverter of the series a polarity inverted to the polarity of the inverter.

12. The method according to claim 11, wherein the upstream inverter sets as the polarity of its pulse width modulation if the upstream inverter is not arranged as a double inverter and otherwise passes on to the upstream inverter upstream.

13. A method for operating a drive system having a plurality of inverters and a data bus, each inverter including an AC-side terminal adapted to feed a respective electric motor, DC-side terminals of the inverters being connected in parallel with one another and the parallel connection being connected to a DC-side terminal of a rectifier, each inverter including semiconductor switches adapted to be driven according to a pulse width modulation, the inverters being arranged as bus subscribers of a data bus to which a module arranged as master is also connected, comprising:

assigning a respective bus address to each inverter; and
after the assigning, specifying a polarity of the pulse width modulation to each inverter;
wherein the polarity of a first one of the inverters is different than the polarity of a second one of the inverters; and
wherein the data bus has a forward channel and a reverse channel, each inverter including an input and an output of the forward channel and an input and an output of the reverse channel, the master being connected to the input of the forward channel of the first one of the inverters and to the output of the reverse channel of the first one of the inverters, for address assignment, the master sends a first bus address to a first one of the inverters via the forward channel, which the first one of the inverters adopts as its own bus address, the first one of the inverters generates a second bus address from the first bus address and sends the second bus address to the second one of the inverters via the forward channel, the second inverter adopts the second bus address, generates a third bus address from the second bus address, and forwards the third bus address via the forward channel, each further inverter adopting the bus address received via the input of the forward channel as its own bus address, generates a further bus address from the received bus address and sends the further to the downstream inverter via the forward channel, a last inverter recognizes itself as the last inverter due to a failure of a further sending of the bus address generated thereby.

14. A method for operating a drive system having a plurality of inverters and a data bus, each inverter including an AC-side terminal adapted to feed a respective electric motor, DC-side terminals of the inverters being connected in parallel with one another and the parallel connection being connected to a DC-side terminal of a rectifier, each inverter including semiconductor switches adapted to be driven according to a pulse width modulation, the inverters being arranged as bus subscribers of a data bus to which a module arranged as master is also connected, comprising:

assigning a respective bus address to each inverter; and
after the assigning, specifying a polarity of the pulse width modulation to each inverter;
wherein the polarity of a first one of the inverters is different than the polarity of a second one of the inverters;
wherein the master sends a broadcast telegram recurrently for address assignment via the data bus, which assigns to a respective address information a respective polarity information; and
wherein a voltage signal is feedable from the master to a first inverter and a voltage signal is feedable from a respective inverter to a respective next inverter, the respective inverter receiving the voltage signal takes the address information and/or polarity information contained in a temporally subsequent broadcast telegram of the master for itself and only thereafter sends a voltage signal to the respective next inverter.

15. The method according to claim 14, wherein the inverters are arranged in a series with respect to forwarding of the voltage signal and/or with respect to the data bus.

16. The method according to claim 14, wherein a last inverter specifies to an upstream inverter the polarity that is inverted to its own polarity used in the pulse width modulation, whereupon the upstream inverter specifies to an upstream inverter the polarity which is inverted to its own polarity used in the pulse width modulation.

17. A method for operating a drive system having a plurality of inverters and a data bus, each inverter including an AC-side terminal adapted to feed a respective electric motor, DC-side terminals of the inverters being connected in parallel with one another and the parallel connection being connected to a DC-side terminal of a rectifier, each inverter including semiconductor switches adapted to be driven according to a pulse width modulation, the inverters being arranged as bus subscribers of a data bus to which a module arranged as master is also connected, comprising:

assigning a respective bus address to each inverter; and
after the assigning, specifying a polarity of the pulse width modulation to each inverter;
wherein the polarity of a first one of the inverters is different than the polarity of a second one of the inverters; and
wherein after the address assignment to the inverters, the master transmits to the inverters the polarity to be used in the respective pulse width modulation, the polarities being assigned such that a sum of a nominal power of the respective inverter multiplied by the respective polarity becomes minimal in terms of amount.

18. The method according to claim 17, wherein adjacently arranged inverters have a polarity different from one another.

19. A method for operating a drive system having a plurality of inverters and a data bus, each inverter including an AC-side terminal adapted to feed a respective electric motor, DC-side terminals of the inverters being connected in parallel with one another and the parallel connection being connected to a DC-side terminal of a rectifier, each inverter including semiconductor switches adapted to be driven according to a pulse width modulation, the inverters being arranged as bus subscribers of a data bus to which a module arranged as master is also connected, comprising:
 assigning a respective bus address to each inverter; and
 after the assigning, specifying a polarity of the pulse width modulation to each inverter;
 wherein the polarity of a first one of the inverters is different than the polarity of a second one of the inverters; and
 wherein the first one of the inverters includes half-bridges connected in parallel to one another and fed from a DC voltage, each half-bridge of the first one of the inverters arranged as a series connection of at least two controllable semiconductor switches, the second one of the inverters including half-bridges connected in parallel to one another and fed from the DC voltage, each half-bridge of the second one of the inverters arranged as a series connection of at least two controllable semiconductor switches, the semiconductor switches being driven with pulse width modulated drive signals;
 wherein, as long as a quotient of a pulse width modulation ratio of the drive signal for a first semiconductor bridge of the first one of the inverters and the pulse width modulation ratio of the drive signal for a second semiconductor bridge of the second one of the inverters is smaller than a threshold value, at a beginning of a respective pulse width modulation period, an upper switch of the first half-bridge of the first one of the inverters is open and a lower switch of the first half-bridge of the first one of the inverters is closed, and a upper switch of the second half-bridge of the second one of the inverters is closed and a lower switch of the second half-bridge of the second one of the inverters is open; and
 wherein, as long as the quotient of the pulse width modulation ratio of the drive signal for a first semiconductor bridge of the first one of the inverters and the pulse width modulation ratio of the drive signal for a second semiconductor bridge of the second one of the inverters is larger than a threshold value, at the beginning of a respective pulse width modulation period, the upper switch of the first half-bridge of the first one of the inverters is open and the lower switch of the first half-bridge of the first one of the inverters is closed, and the upper switch of the second half-bridge of the second one of the inverters is open and the lower switch of the second half-bridge of the second one of the inverters is closed.

20. A method operating a drive system that includes a first inverter, a second inverter, a first electric motor fed from an AC-side terminal of the first inverter, a second electric motor fed from an AC-side terminal of the second inverter, a DC-side terminal of the first inverter connected in parallel with a DC-side terminal of the second inverter and the parallel connection being supplied from a DC voltage, the first inverter including half-bridges connected in parallel to one another and fed from the DC voltage, each half-bridge of the first inverter including a series connection of at least two controllable semiconductor switches, the second inverter including half-bridges connected in parallel to one another and fed from the DC voltage, each half-bridge of the second inverter arranged as a series connection of at least two controllable semiconductor switches, the semiconductor switches of the first inverter and the second inverter being driven with pulse width modulated drive signals, comprising:
 as long as a difference between a pulse width modulation ratio of a drive signal for a first semiconductor bridge of the first inverter and a pulse width modulation ratio of a drive signal for a second semiconductor bridge of the second inverter is smaller than a threshold value, at a beginning of a respective pulse width modulation period, opening an upper switch of a first half-bridge of the first inverter, closing a lower switch of the first half-bridge of the first inverter, closing an upper switch of a second half-bridge of the second inverter, and opening a lower switch of the second half-bridge of the second inverter; and
 as long as the difference between the pulse width modulation ratio of the drive signal for a first semiconductor bridge of the first inverter and the pulse width modulation ratio of the drive signal for a second semiconductor bridge of the second inverter is larger than a threshold value, at the beginning of a respective pulse width modulation period, opening the upper switch of the first half-bridge of the first inverter, closing the lower switch of the first half-bridge of the first inverter, opening the upper switch of the second half-bridge of the second inverter, and closing the lower switch of the second half-bridge of the second inverter.

21. The method according to claim 20, wherein the DC voltage is available at a DC-side terminal of a line-fed rectifier.

22. The method according to claim 20, wherein the rectifier is supplied from an AC voltage network and a DC-side terminal of the rectifier is connected in parallel with the DC-side terminal of the first inverter and with the DC-side terminal of the second inverter.

23. The method according to claim 20, wherein pulse width modulation signals of the first inverter run synchronously and/or synchronized with pulse width modulation signals of the second inverter.

24. The method according to claim 20, wherein a start of pulse width modulation periods of the first inverter and the second inverter occurs synchronously and/or simultaneously.

25. The method according to claim 20, wherein, within each pulse width modulation period, a first switching edge of a drive signal for an upper semiconductor switch of the first inverter is inverted and/or occurs inversely to a first switching edge of a drive signal for an upper semiconductor switch of the second inverter.

26. The method according to claim 20, wherein one of the controllable semiconductor switches of a respective half-bridge is connected to an upper potential of the DC voltage.

27. The method according to claim 20, wherein one of the controllable semiconductor switches of a respective half-bridge is connected to a lower potential of the DC voltage.

28. The method according to claim 20, wherein, at a beginning of a respective pulse width modulation period, an upper switch of a first half-bridge of the first inverter is open, a lower switch of the first half-bridge of the first inverter is closed, an upper switch of a second half-bridge of the second inverter is closed, and a lower switch of the second half-bridge of the second inverter is open.

29. The method according to claim 20, wherein a synchronization signal and/or a synchronization signal having synchronization pulses is (a) modulated onto conductor rails that connect the DC-side terminals of the inverters to each other and to the DC-side terminal of the rectifier and/or (b) is sent recurrently by the master as a broadcast telegram to all inverters by a data bus.

30. The method according to claim 29, wherein the pulse width modulation of all inverters are synchronized in dependence on the synchronization signal.

31. A drive system, comprising:
a first inverter; and
a second inverter;
wherein the drive system is adapted to perform the method recited in claim 20;
wherein the DC-side terminals of the inverters are connected to each other and to a DC-side terminal of a rectifier by conductor rails; and
wherein each inverter is connected to an upstream inverter and/or a downstream inverter by at least one line adapted to feed a voltage signal with at least one electrical line.

* * * * *